May 3, 1949.  J. C. LITTLE  2,469,167
VIBRATION DAMPER
Filed June 11, 1946  2 Sheets-Sheet 1
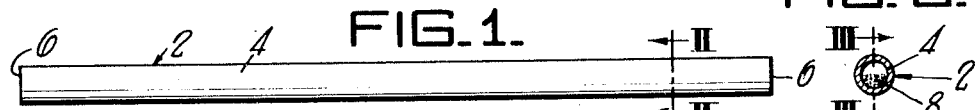
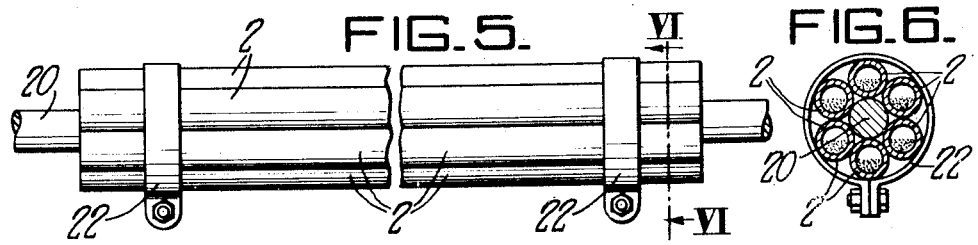
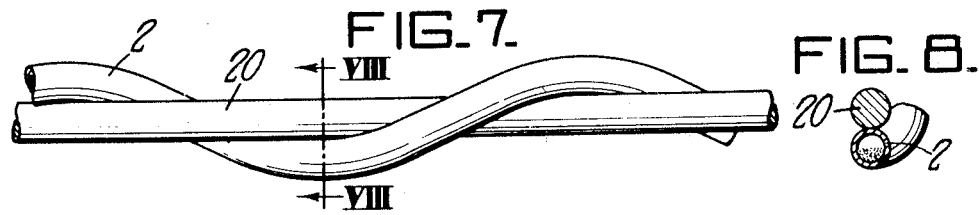
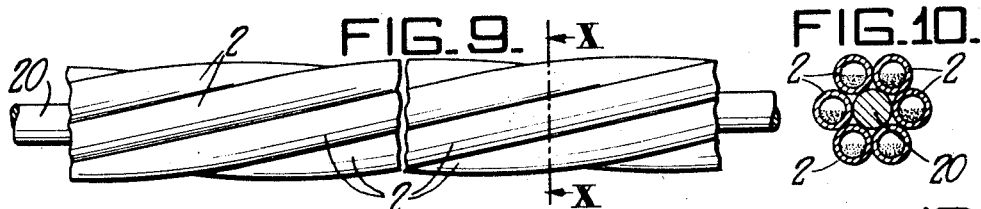
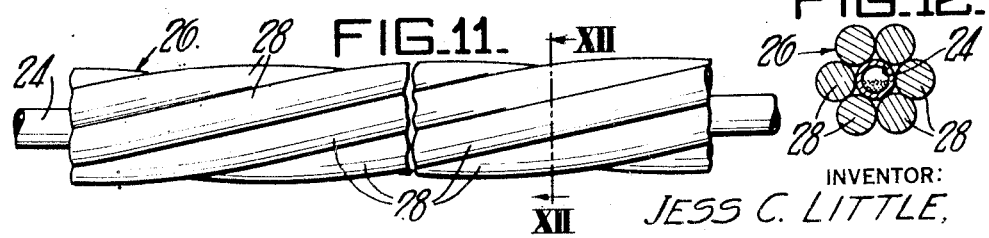
INVENTOR:
JESS C. LITTLE,
BY: Donald G. Dalton
HIS ATTORNEY.

May 3, 1949. J. C. LITTLE 2,469,167
VIBRATION DAMPER
Filed June 11, 1946 2 Sheets-Sheet 2
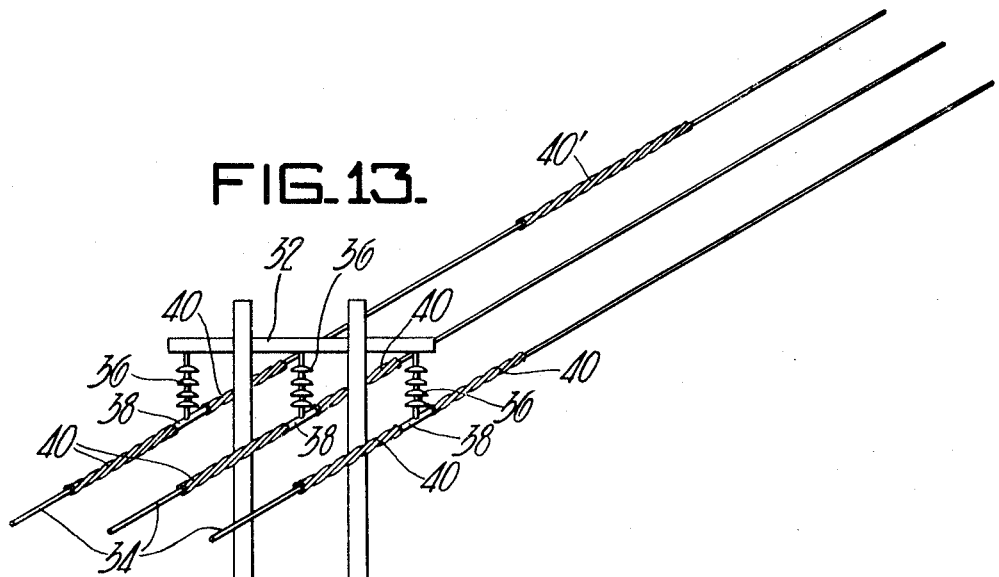
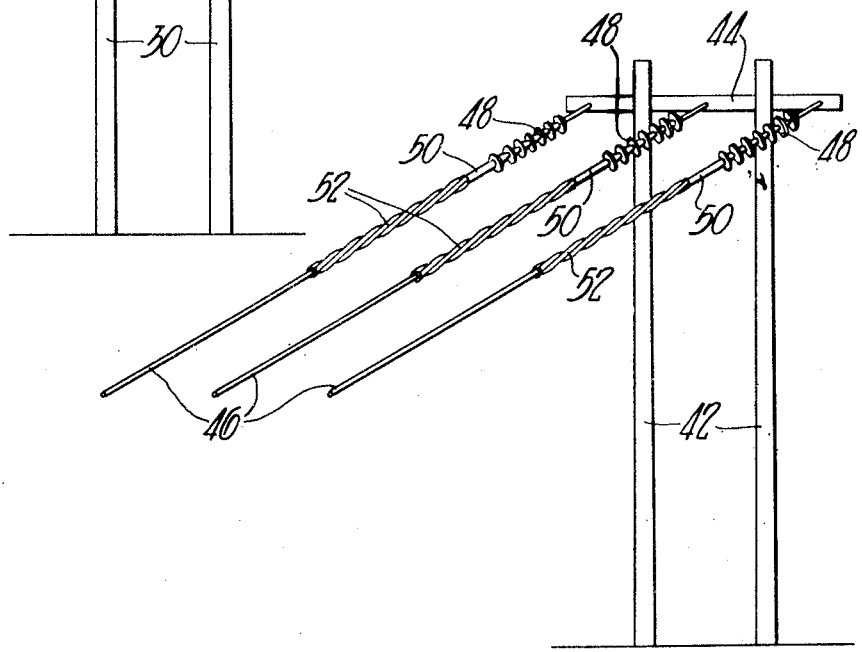
INVENTOR:
JESS C. LITTLE,
BY: Donald G. Dalton
HIS ATTORNEY.

Patented May 3, 1949

2,469,167

UNITED STATES PATENT OFFICE 2,469,167

VIBRATION DAMPER

Jess C. Little, Cleveland, Ohio, assignor to The American Steel and Wire Company of New Jersey, a corporation of New Jersey Application June 11, 1946, Serial No. 676,064

6 Claims. (Cl. 174—42)

This invention relates to a vibration damper for application to or incorporation in relatively thin elongated elements which may be hung, for example, in free spans. The vibration damper of the present invention may be used to advantage in connection with overhead conductors, cables, guy wires, and the like.

The invention has among its objects the provision of a cheap, simple, and easily applied vibration damper for application to thin elongated members, such as overhead conductors, cables, guy wires, and the like, whereby to minimize vibration and thus fatigue failures in such members.

This and other objects of the invention will be more readily apparent from a consideration of the following description.

Thin elongated members such as conductors, cables, and guy wires, which are supported in rather long spans overhead in the out-of-doors, are subjected to various forces such as wind, which set them into various modes of vibration and tend to continue them in such vibrating state. As a result, such members are almost constantly in motion, any given element thereof being bent with respect to the elements on either side, such bending being most pronounced at points where the thin elongated member is restrained or held rigidly, such as at the supporting insulators.

As a consequence of such bending action the member in time is seriously weakened by fatigue from the innumerable small bends, and eventually breaks. The vibration damper of the present invention is designed for easy application to or incorporation in thin elongated members such as those described. It results in cutting down markedly the vibration of the member at the point where it is applied or incorporated and at points adjacent thereto, and consequently lengthens the service life of such member very greatly.

Briefly, the vibration damper comprises a chamber or chambers containing a substantial quantity of hard small particles, there being a considerable amount of free space within the chamber so that the particles may move about appreciably when the damper is vibrated. The energy absorbed by the damper by reason of the sliding of the particles over each other is supplied by the member to which the damper is attached or in which it is incorporated. Such absorption of energy, which is dissipated as heat, cuts down appreciably the amplitude of vibration of the member to which the damper is attached, and tends quickly to bring such member to rest. The invention will be illustrated in connection with this application to or in overhead conductors. It will be understood, however, that it may be used to advantage on other members such as guy wires, rods, and the like where similar vibration problems occur.

The invention will be more fully understood by reference to the accompanying drawings, in which:

Figure 1 is a view in side elevation of one embodiment of a vibration damper element made in accordance with the present invention;

Figure 2 is a view in transverse section of the element shown in Figure 1, the section being taken along the line II—II in Figure 1;

Figure 3 is a view in longitudinal section through such vibration damper element, the section being taken along the line III—III of Figure 2;

Figure 4 is a view in longitudinal cross section of a vibration damper element of modified construction;

Figure 5 is a view in side elevation of a conductor with a vibration damper applied thereto;

Figure 6 is a view in cross section through the structure shown in Figure 5, the section being taken along the line VI—VI in Figure 5;

Figure 7 is a view in side elevation of a conductor with a vibration damper applied thereto in a modified manner;

Figure 8 is a view in cross section through the structure shown in Figure 7, the section being taken along the line VIII—VIII of Figure 7;

Figure 9 is a view in side elevation of a conductor with a vibration damper applied thereto, the elements of the damper being disposed helically about the conductor;

Figure 10 is a view in cross section through the structure shown in Figure 9, the section being taken along the line X—X of Figure 9;

Figure 11 is a view in side elevation of a cable having the core thereof made in the form of a vibration damper element constructed in accordance with the invention;

Figure 12 is a view in cross section through the structure of Figure 11, the section being taken along the line XII—XII of Figure 11;

Figure 13 is a view in perspective of the vibration damper which is shown in Figures 9 and 10 applied to overhead conductors in the vicinity of the supporting insulators; and Figure 14 is a view similar to Figure 13 but with the dampers applied to the conductors at their ends near the strain insulators.

In its simplest embodiment a vibration damper element of the present invention, generally designated by the reference character 2, may be made of a tube, such as tube 4, in Figures 1, 2 and 3, such tube having end closures 6. The chamber thus formed within the tube contains a substantial quantity of small particles of hard material 8. In the embodiment shown in Figures 2 and 3 such small hard particles fill substantially 50% of the space in the chamber. The quantity of the particles may be varied appreciably, the requirements to be observed being, first, that their mass constitutes a substantial part of the total mass of the damper, on the order of at least 25% thereof, and, second, that there be sufficient free space within the chamber above the particles to allow a substantial length of travel vertically for the particles. The filling of the chamber to such extent that 50% of the space is occupied by the particles, when the damper is at rest, has been found to work very well, but it will be understood that the damper will perform satisfactorily so long as the above two conditions as to mass of the particles and the free space above the particles are observed.

When a vibration damper in accordance with the present invention composed of one or more elongated elements such as above described is to be made in fairly great lengths, or where the damper is to be installed in positions in which it is not substantially horizontal, it is preferred to modify the element in the manner shown in Figure 4. The element there shown, designated 2', consists of a tube 12 having end closures 14 and internal transverse partitions 16 which, preferably, to obtain uniformity of action are equally spaced along the length of the element. The chambers formed by the partitions and end closures of the element are each provided with a quantity of small hard particles 18, such quantity in each chamber being chosen in accordance with the principles set out above.

The tubes, end closures, and partitions of the element may be formed of any suitable material. It is preferred, because of the wear which these elements undergo by reason of their frictional contact with the particles, to make them of metal or other abrasion resisting material. The small particles should be relatively heavy, wear resistant, and preferably cheap. A crushed material such as ferromanganese has been found to be satisfactory. Other heavy powder material such as tungsten or tungsten carbide may also be used. Because friction between particles themselves and between the particles and the walls of the chamber is increased the rougher are the surfaces of the particles; particles resulting from crushing are to be preferred to those which are produced by methods which yield particles with rounded, smooth surfaces.

The vibration damper element may be employed in a variety of ways, some of which are shown in Figures 6 to 12, inclusive. In Figures 5 and 6 the vibration damper is composed of a plurality of damper elements 2 disposed about a conductor 20 and held in place by clamps 22. In Figures 7 and 8 a single damper element 2 is helically disposed about the conductor 20. The damper may be retained on the conductor merely by its being bent therearound, or it may be soldered or otherwise attached thereto.

In Figures 9 and 10 conductor 20 is provided with a damper composed of a plurality of damper elements 2, such elements being disposed helically about the conductor and being so laid up therearound as to be retained mechanically.

The vibration damper element of the present invention may, instead of being applied to a conductor, be incorporated therein as a part of such conductor. In Figures 11 and 12 there is shown a conductor 26 having a central core 24 and a plurality of helically laid up conductor elements 28 thereabout. As shown in Figure 12 the conductor core 24 consists of a vibration damper element such as shown in Figures 1 to 4, inclusive, such element extending continuously through the cable. It is preferred as explained above in applications of this type to employ the element with transverse partitions as shown in Figure 4.

Figures 13 and 14 illustrate two of the possible modes of application of the vibration damper shown in Figures 9 and 10 to conductor cables. As shown in Figure 13 the supporting structure consists of poles 30, cross bar 32 from which conductors 34 are suspended through the medium of insulators 36, and suspension clamps 38. Since in this type of suspension bending of the conductors due to vibration of the span is most severe adjacent the suspension clamps, vibration dampers 40 are applied as shown on each side of such clamps. In some installations it may also be desired to attach such damper to the conductor at points within the span as shown in the case of damper 40' in Figure 13.

In Figure 14 use of the dampers at the terminus of a conductor is shown. Poles 42 and cross bar 44 support the ends of conductors 46 through the medium of strain insulators 48 and strain clamps 50. In this instance the vibration dampers 52 are placed upon the conductors within the span but in a location immediately adjacent the strain clamps.

Having thus fully disclosed preferred embodiments of the vibration damper of the present invention and preferred modes of its use, I desire to claim as new the following.

I claim:

1. A vibration damper comprising an elongated tube of substantially helical form, end closures on the tube, and a quantity of small particles of hard material within the tube sufficient to fill a substantial part of the space but to leave a substantial free space therein.

2. A vibration damper comprising an elongated tube of substantially helical form, end closures on the tube, transverse partitions within the tube dividing the space within it into a plurality of chambers, and a quantity of small particles of hard material within each chamber sufficient to fill a substantial part of the space but to leave a substantial free space therein.

3. The combination, with an elongated relatively thin member mounted so as to be subject to vibration, of a vibration damper affixed thereto, said damper comprising an elongated tube, end closures on the tube, and a quantity of small particles of hard material within the tube sufficient to fill a substantial part of the space but to leave a substantial free space therein, the damper being disposed helically about the elongated member.

4. The combination, with an elongated relatively thin member mounted so as to be subject to vibration, of a vibration damper affixed thereto, said damper comprising a plurality of parallel tubes helically disposed about and along the elongated member, each tube having end closures and having a quantity of small particles of hard material within it sufficient to fill a substantial part of the space but to leave a substantial free space therein.

5. The combination, with an elongated relatively thin member mounted so as to be subject to vibration, of a vibration damper affixed thereto, said damper comprising an elongated tube, end closures on the tube, and a quantity of small particles of hard material within the tube sufficient to fill a substantial part of the space but leave a substantial free space therein, said tube being disposed along the elongated member and being in contact therewith throughout substantially the entire length of the tube.

6. The combination, with an elongated relatively thin member mounted so as to be subject to vibration, of a vibration damper affixed thereto, said damper comprising a plurality of elongated tubes, each tube having end closures and having a quantity of small particles of hard material within it sufficient to fill a substantial part of the space but to leave a substantial free space therein, each of said tubes being disposed along the elongated member so as to be in contact therewith throughout substantially their entire length.

JESS C. LITTLE.

REFERENCES CITED

The following references are of record in the file of this patent:

UNITED STATES PATENTS

| Number | Name | Date |
|---|---|---|
| 1,675,391 | Stockbridge | July 3, 1928 |
| 1,773,659 | Austin | Aug. 19, 1930 |
| 2,225,333 | Daniels | Dec. 17, 1940 |

FOREIGN PATENTS

| Number | Country | Date |
|---|---|---|
| 529,822 | Germany | July 20, 1931 |
| 543,130 | Germany | Feb. 1, 1932 |
| 631,863 | Germany | June 29, 1936 |
| 644,628 | Germany | May 10, 1937 |